(12) United States Patent
Holloway et al.

(10) Patent No.: US 7,327,242 B2
(45) Date of Patent: Feb. 5, 2008

(54) LIMITING AND CONTROLLING MOTOR VEHICLE OPERATION FUNCTIONS ENABLED FOR EACH OF A GROUP OF DRIVERS OF THE VEHICLE

(75) Inventors: Lane Thomas Holloway, Pflugerville, TX (US); Walid M. Kobrosly, Round Rock, TX (US); Nadeem Malik, Austin, TX (US); Marques Benjamin Quiller, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 10/943,052

(22) Filed: Sep. 16, 2004

(65) Prior Publication Data

US 2006/0066149 A1 Mar. 30, 2006

(51) Int. Cl.
*B60Q 1/00* (2006.01)
(52) U.S. Cl. ............... 340/439; 340/426.13; 180/170
(58) Field of Classification Search .......... 340/439, 340/426.13, 539.1, 5.8; 701/1; 180/170, 180/271
See application file for complete search history.

(56) References Cited

U.S. PATENT DOCUMENTS 5,172,785 A * 12/1992 Takahashi ............... 180/271
5,933,075 A * 8/1999 Ditson .................. 340/426.11
6,807,464 B2 * 10/2004 Yu et al. ..................... 701/1
6,895,233 B2 * 5/2005 Chen et al. ................ 455/345

* cited by examiner

*Primary Examiner*—Phung T. Nguyen
(74) *Attorney, Agent, or Firm*—Julius B. Kraft; Gregory M. Doudnikoff

(57) ABSTRACT

A system controlled by a data processor for controlling vehicle operational functions enabled for each of a plurality of vehicle drivers comprising a combination of means for assigning to each of a group of drivers a vehicle operation key with a unique identifier, means for storing these identifiers, means for assigning to each of the group of drivers a set of operational functions that each driver is enabled to perform, means for designating a vehicle operation manager and means enabling this operation manager to modify each of the set of operational functions assigned to each of the group of drivers. The vehicle has means for directly receiving one of said vehicle operation keys together with means responsive to the receiving of the key for enabling all of the operational functions assigned to the driver who is identified by the key identifier. In accordance of a further feature of this aspect of the invention, the vehicle operation manager is one of the plurality of drivers and the modification of each of the set of operational functions assigned to each of the plurality of drivers is one of the functions that the manager is enabled to perform. According to another aspect of this invention, the manager is enabled to make modifications dynamically during the operation of the automobile.

18 Claims, 4 Drawing Sheets

LIMITING AND CONTROLLING MOTOR VEHICLE OPERATION FUNCTIONS ENABLED FOR EACH OF A GROUP OF DRIVERS OF THE VEHICLE

TECHNICAL FIELD

The present invention relates to limiting and controlling the operation of motor vehicles to which several drivers have access.

BACKGROUND OF RELATED ART

The control of operation and operators, i.e. drivers of motor vehicles, has always presented problems to the owners or hosts with responsibility for the operation of such motor vehicles. The manager of a fleet of trucks is responsible to insure that the trucks are operated according to the rules of the operating organization. Likewise, the parent or head of household has the duty of insuring that household automobiles are safely driven by those authorized to do so. Also, some of the drivers may have limitations as to when and under what conditions they may drive automobiles. This particularly may be the case with underage drivers, drivers with a restrictive license due to physical infirmities or drivers with restrictions due to legal problems. In addition, keys to automobile starters would often fall into unauthorized and even dangerous hands. Under such circumstances, the owner or manager of the vehicle would then have to proceed to regain physical control of it.

Fortunately, with the technological advance of two technologies, it now possible for the owner or manager of the automobile (used interchangeably with motor vehicle) to dynamically control and limit the access to his automobile even when he does not have physical possession of the automobile. Progress in two technologies has made this possible. Over the last generation, computer control of automobile operation has become quite extensive. Every automobile has an engine control unit and a variety of sensors that are capable of sensing a wide variety of operating conditions. In addition, wireless telephones and, particularly, cellular telephones have become so pervasive that their world wide number is in the order of hundreds of millions. Thus, telecommunication offers a convenient technology by which the manager of a motor vehicle may remotely control automotive functions.

SUMMARY OF THE PRESENT INVENTION

The present invention takes advantage of existing automobile sensing and control technology, as well as existing wireless telecommunications to provide a system controlled by a data processor for controlling vehicle operational functions enabled for each of a plurality of vehicle drivers comprising a combination of means for assigning to each of a group of drivers a vehicle operation key with a unique identifier, means for storing these identifiers, means for assigning to each of the group of drivers a set of operational functions that each driver is enabled to perform, means for designating a vehicle operation manager and means enabling this operation manager to modify each of the set of operational functions assigned to each of the group of drivers.

The automobile or like motor vehicle has means for directly receiving one of said vehicle operation keys, together with means responsive to the receiving of the key for enabling all of the operational functions assigned to the driver who is identified by the key identifier. In accordance with a further feature of this aspect of the invention, the vehicle operation manager is one of the plurality of drivers and the modification of each of the set of operational functions assigned to each of the plurality of drivers is one of the functions that the manager is enabled to perform. According to another aspect of this invention, the manager is enabled to make modifications dynamically during the operation of the automobile.

The automobile operations manager is enabled to remotely and dynamically control the automobile operations through existing wireless telecommunication technology. His commands to effect control of the functions that the automobile drivers are permitted to perform are wirelessly transmitted to the automobile and, consequently, the control system.

In accordance with a further aspect of this invention, there are means for sensing a selected set of motor vehicle operating conditions, combined with means responsive to the means for sensing operating conditions for automatically modifying the functions that the operators are enabled to perform in response to these predetermined sensed operating conditions. Under certain circumstances, these sensed operating conditions could indicate an emergency. In such a case, all limitations on operational functions are interrupted.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
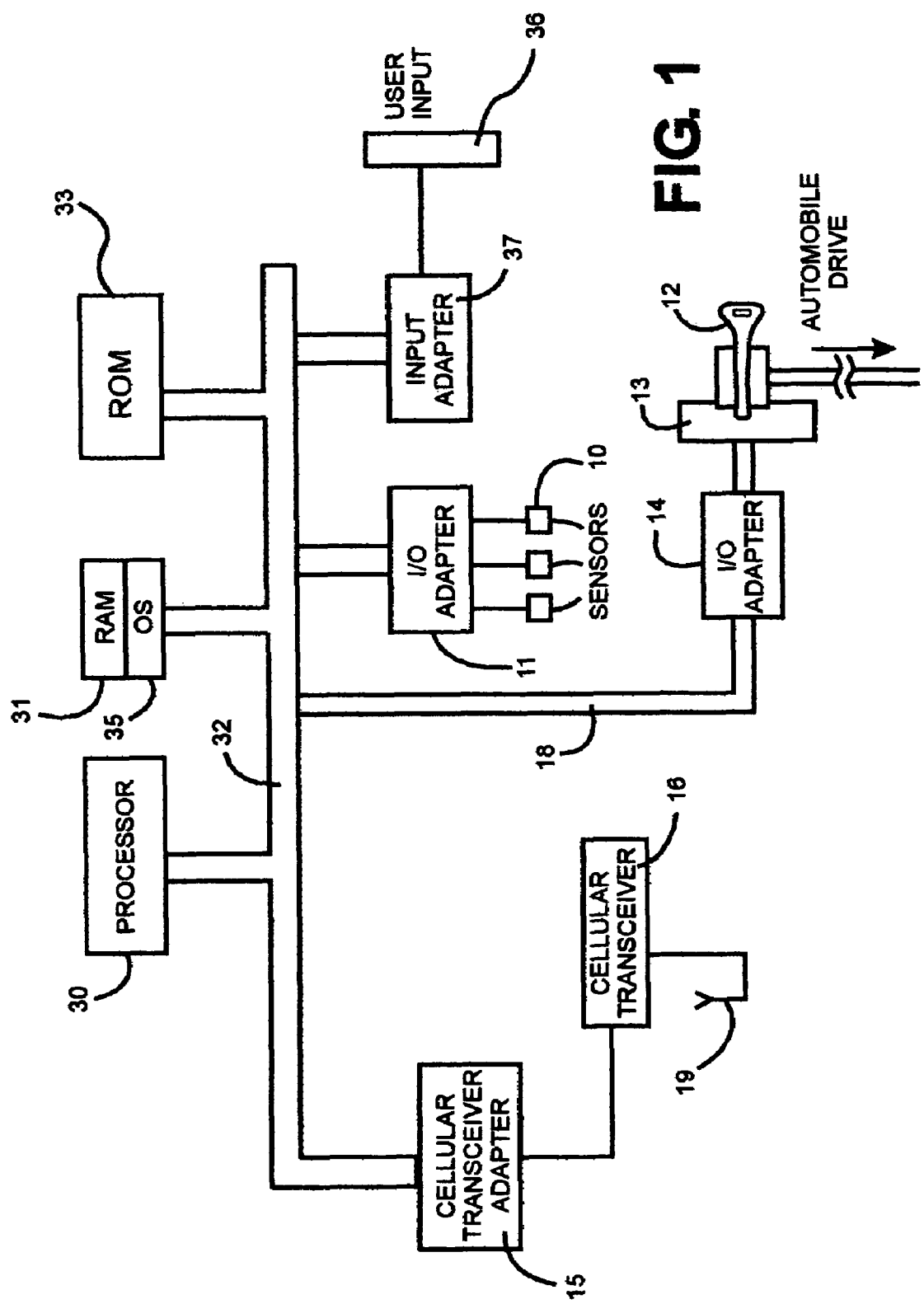
FIG. 1 is a block diagram of a generalized data processing system including a processor unit that provides the on-board automobile computer control for system of the present invention for controlling the vehicle operational functions to which a group of drivers are each given specific limited access.

Referring to FIG. 1, there is provided a diagrammatic view of a typical computer control system that may function as an automobile on-board controller for various automotive functions, including the vehicle operational functions to which a group of drivers are each given specific limited access, as well as the apparatus for monitoring and controlling it remotely through wireless communications.

Sensors 10 are positioned throughout the automobile and connected via I/O adapter 11 to a central processing unit 30, which, in turn, is interconnected to various other components by system bus 32. The sensors monitor the various conditions that could limit operational functions that each of the set of drivers are enabled to perform in accordance with this invention, e.g. engine temperature, oil pressure, torques at various points, speed, acceleration and milage driven. An operating system 35 that runs on processor 30 provides control and is used to coordinate the functions of the various components of the control system. The OS 35 is stored in Random Access Memory (RAM) 31; which, in a typical automobile control system, has from four to eight megabytes of memory. The programs for the various automobile monitor and control functions, including those of the present invention, are permanently stored in Read Only Memory (ROM) 33 and moved into and out of RAM to perform their respective functions. The identification of the drivers of the automobile, the operational functions that each driver is authorized to perform by the automobile manager and the operational parameters that limit the performance of operational functions by each driver are all stored in RAM 31.

Accordingly, when the driver inserts his key into the ignition receiving element 13, not only is the standard linkage to the automobile drive set up but via I/O adapter 14 an appropriate connection 18 to the control system of the automobile is activated. Then, as will be subsequently described, the programming system of the present invention will determine the limitations if any imposed upon the driver who started the automobile according to the limitations stored by the operations manager, usually the owner or host of the automobile.

This manager is enabled to dynamically change the operational functions and limitations when each of the group of authorized drivers are permitted to perform. The manager may make such changes directly merely by inserting his own key 12 that will be identified as the manager's key. If the manager is at the controls of the automobile, he inputs his changes through general input means 36 connected through I/O adapter 37. Input means 36 may be a combination of standard dashboard buttons and/or an interactive I/O display system wherein the manager provides commands to the automobile control system.

Figure 2:
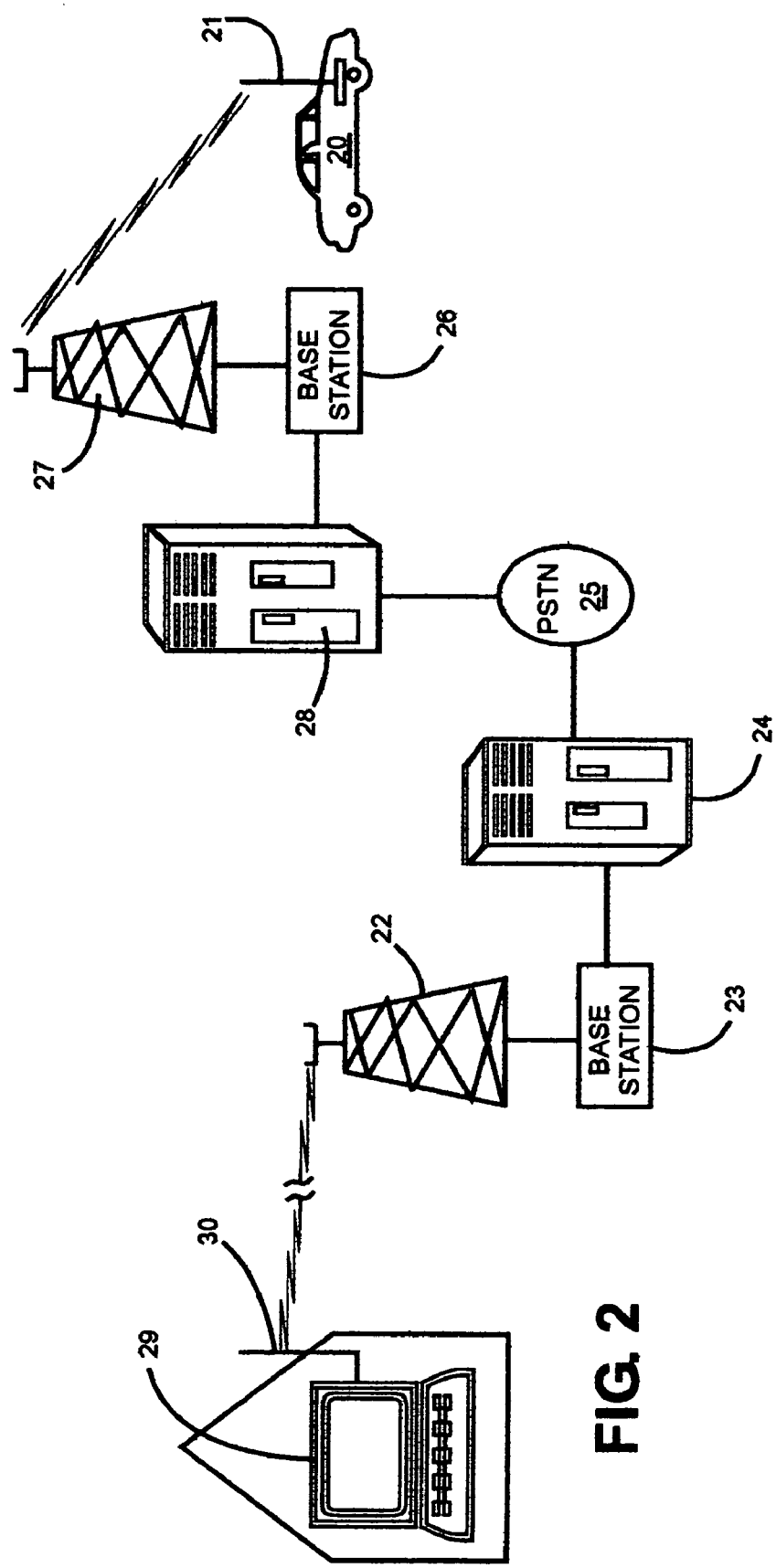
FIG. 2 is a generalized diagrammatic view of a portion of a wireless mobile cellular telecommunications network showing how the operational functions permitted to drivers may be dynamically remotely controlled in accordance with the invention.

Alternatively, the manager may wirelessly and remotely make changes in the operating functions that the drivers are each enabled to perform. Such remote input, which will be described in greater detail with respect to FIG. 2, is wirelessly received in the automobile through antenna 19 connected to a transceiver that is connected into the automobile control system through adapter 15. The transceiver may conveniently be a cellular transceiver 16 that is merely a modified cellular telephone modified to transmit and receive signals to and from cellular towers within the 824-894 MHz frequencies.

At this point, before describing remote access by the automobile manager with respect to FIG. 2, some general background information on cellular telephone systems should be reviewed. In the cellular system for the handheld mobile wireless phone, an area such as a city is broken up into small area cells. Each cell is about 10 square miles in area. Each has its base station that has a tower for receiving/transmitting and a base connected into PSTN. Even though a typical carrier is allotted about 800 frequency channels, the creation of the cells permit extensive frequency reuse so that tens of thousands of people in the city can be using their cell phones simultaneously. Cell phone systems are now preferably digital with each cell having over 160 available channels for assignment to users. In a large city there may be hundreds of cells, each with its tower and base station. Because of the number of towers and users per carrier, each carrier has a Mobile Telephone Switching Office (MTSO) that controls all of the base stations in the city or region and controls all of the connections to the land based PSTN.

When a client cell phone gets an incoming call, MTSO tries to locate what cell the client mobile phone is in. The MTSO then assigns a frequency pair for the call to the cell phone. The MTSO then communicates with the client over a control channel to tell the client or user what frequency channels to use. Once the user phone and its respective cell tower are connected, the call is on between the cell phone and tower via two-way long range RF communication. In the United States, cell phones are assigned frequencies in the 824-894 MHz ranges.

Now, with respect to FIG. 2, assuming that the automobile manager on his remote wireless computer 29 is communicating with automobile 20 to effect some changes in the stored operational functions that each driver is enabled to perform. The manager at wireless computer 29 calls or commences telecommunication via a wireless signal from antenna 30. Once appropriate contact is established with closest tower 22 the transmission would be conventional. The signals are passed through base station 23 to switching center 24 that then controls the routing of the call to a PSTN 25. The PSTN 25 then, in the conventional cellular manner, routes the call through switching center 28. Then, the telephone signal is routed through the cellular system to the base station 26 of the nearest tower 27 from which the wireless transmission is sent to the automobile 20 being controlled where signals are received via antenna 21.

Figure 3:
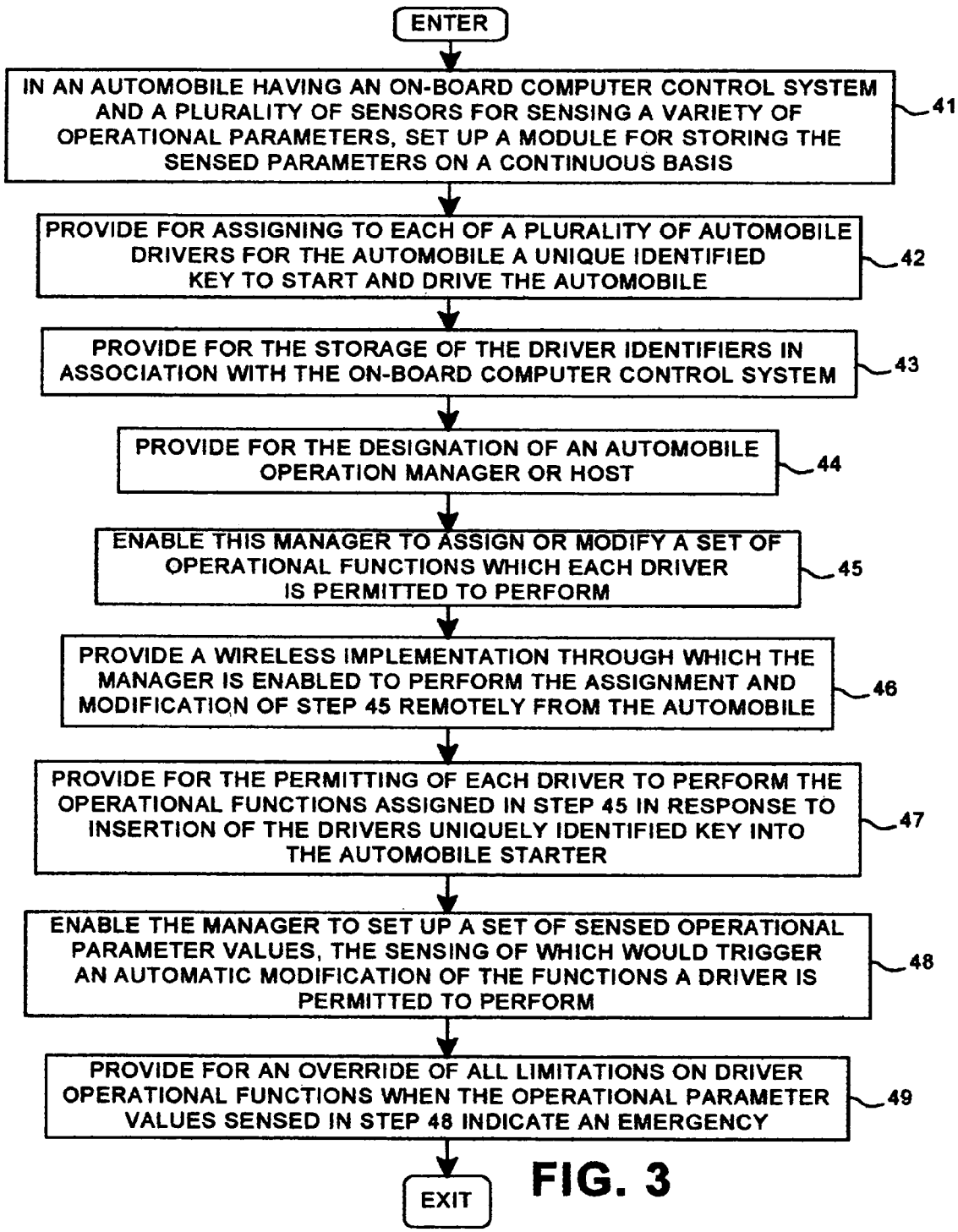
FIG. 3 is an illustrative flowchart describing the setting up of the elements needed for controlling the vehicle operational functions to which a group of drivers are each given specific limited access according to the program of the invention.

Now, with reference to the programming shown in FIG. 3, there will be described how the system and programs of the present invention are set up. In an automobile having a standard on-board computer system that, among other functions, controls the limited operational functions that each of a set of drivers are enabled to perform, a plurality of sensors continuously sense a variety of operational parameters that are stored, step 41. Provide for the assigning to each of the set of drivers a uniquely identified ignition key for the automobile, step 42. Provide for the storage of the identifiers assigned in step 42 in the on-board computer system, step 43. Provide for the designation of an automobile manager, step 44. This manager is enabled to assign or modify a set of operational parameters that each driver is permitted to perform, step 45. There is provided a wireless implementation wherein the manager is enabled to preform the assignment and modifications of step 45 remotely from the automobile, step 46. Provision is made for permitting each driver to perform the assigned operational functions assigned in step 45 in response to the inserting of the drivers' uniquely identified key into the automobile starter, step 47.

The manager is enabled to set up a set of sensed operational function parameter values, the sensing of which would trigger an automatic modification of the functions a driver is permitted to perform, step 48. There is also provided for an override of all limitations of driver operational functions when the operational parameter values sensed in step 48 indicate an emergency, step 49.

Figure 4:
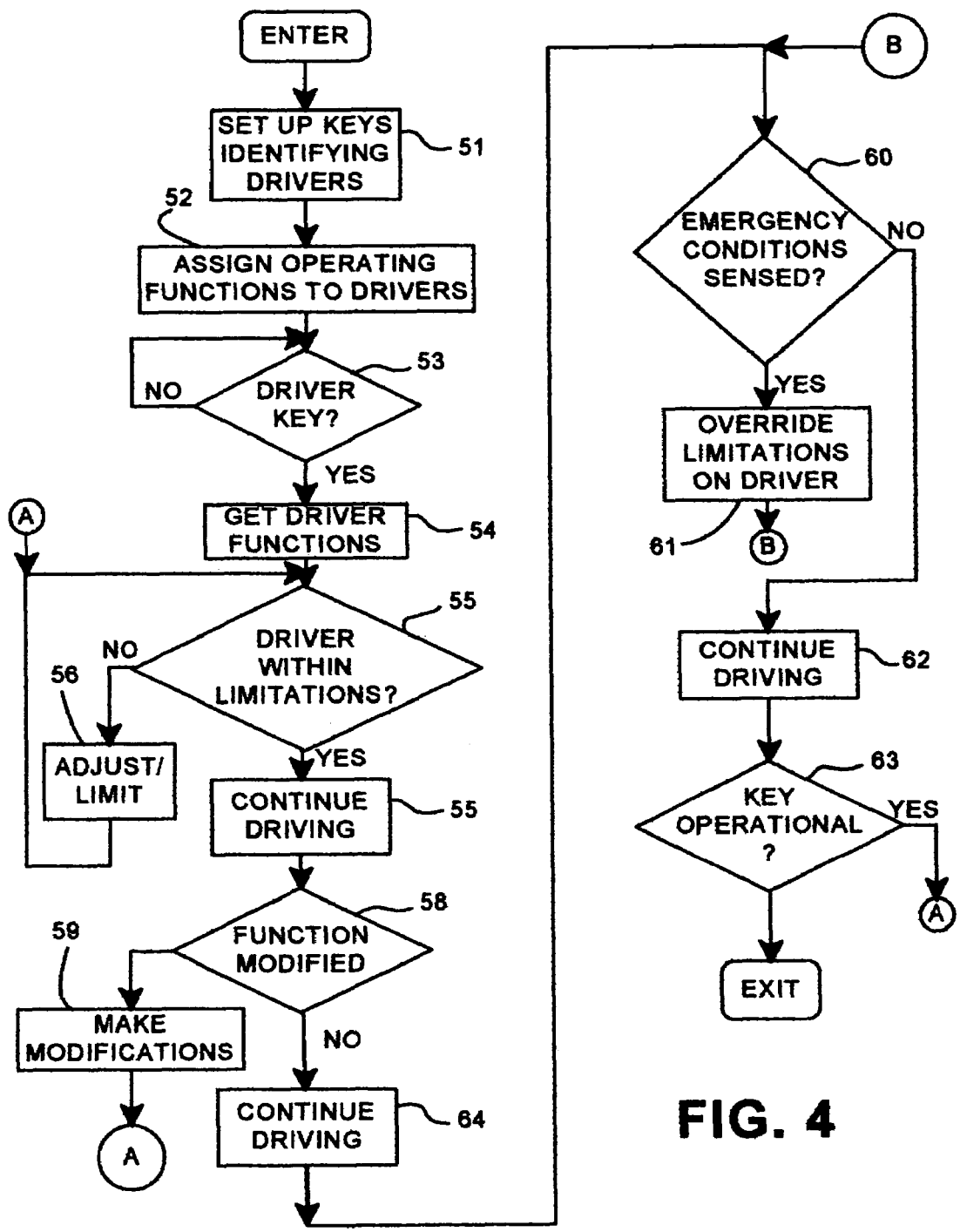
FIG. 4 is a flowchart of an illustrative simplified run of the program set up in FIG. 3.

Now, with reference to the flowchart of FIG. 4, a simplified illustrative run of the process set up in FIG. 3 will be described. The keys identifying the limited operational functions that the group of drivers are enabled to perform are set up, step 51; these are assigned to each of the group of drivers and stored on-board, step 52. A determination is awaited as to when a driver inserts a key into the automobile, step 53. If Yes, the driver is identified and his stored list of enabled operational functions is obtained, step 54. A determination is then made as to whether this identified driver is driving within operational limitations, step 55. If Yes, he is permitted to continue driving, step 57. If No, then, step 56, he is prompted to adjust to get within limitations or the program automatically adjusts to get the driver within limitations. Then, the process is returned to step 55 to determine if the driver may continue to drive. While the driver is continuing to drive, a determination is made, step 58, as to whether the manager has made a modification. If Yes, the modification is made and the process is returned to step 55 via Branch "A". If No, the driver continues to drive, step 59. At any time while the automobile is being driven, if a determination is made that the automobile sensors determine an emergency situation, Yes from step 60, all limitations are overridden to help the driver handle the emergency, step 61, and the process is then branched back to step 60 via branch "B". When the emergency is ended, as indicated by a No from step 60, the control process goes to step 62 where the driver is permitted to continue driving. Of course, the determination continues to be made as whether the ignition key is still active, step 63. If No, the driving is over and the program is exited. If Yes, the driving control process is returned to step 55 via Branch "A".

Although certain preferred embodiments have been shown and described, it will be understood that many changes and modifications may be made therein without departing from the scope and intent of the appended claims.

What is claimed is:

1. A motor vehicle having incorporated therein a data processor controlled system for controlling vehicle operational functions enabled for each of a plurality of vehicle drivers comprising:
    means for assigning to each of said plurality of drivers a vehicle operation key with a unique identifier;
    means for storing said identifiers;
    means for assigning to each of said plurality of drivers a set of operational functions that each driver is enabled to perform;
    means for designating a vehicle operation manager; and
    means enabling said operation manager to dynamically modify each of said set of operational functions assigned to each of said plurality of drivers during the operation of the vehicle by the driver.

2. The system for controlling vehicle operational functions of claim 1 further including:
    means for receiving one of said vehicle operation keys; and
    means responsive to the receiving of said key for enabling all of the operational functions assigned to the driver identified by the key identifier.

3. The system for controlling vehicle operational functions of claim 2 wherein said vehicle operation manager is one of said plurality of drivers and said modification of each of said set of operational functions assigned to each of said plurality of drivers is one of the functions that said manager is enabled to perform.

4. The system for controlling vehicle operational functions of claim 1:
    wherein said means enabling said manager to modify are remote front said motor vehicle; and
    further including means for wirelessly transmitting commands for modifying.

5. The system for controlling vehicle operational functions of claim 1 further including:
    means for sensing a set of motor vehicle operating conditions; and
    means responsive to said means for sensing operating conditions or automatically modifying said functions said operators are enabled to perform in response to predetermined sensed operating conditions.

6. The system for controlling vehicle operational functions of claim 5 wherein:
    said sensed operating conditions indicate an emergency; and
    all limitations on operational functions are interrupted in response to said emergency.

7. In data processor controlled motor vehicle operation, a method for controlling vehicle operational functions enabled for each of a plurality of vehicle drivers comprising:
    assigning to each of said plurality of drivers a vehicle operation key with a unique identifier;
    storing said identifiers;
    assigning to each of said plurality of drivers a set of operational functions that each driver is enabled to perform;
    designating a vehicle operation manager; and
    enabling said operation manager to dynamically modify each of said set of operational functions assigned to each of said plurality of drivers during the operation of the vehicle by the driver.

8. The method for controlling vehicle operational functions of claim 7 further including the steps of:
    receiving one of said vehicle operation keys in said motor vehicle; and
    enabling all of the operational functions assigned to the driver identified by a key identifier in response to the receiving of said key.

9. The method for controlling vehicle operational functions of claim 8 wherein said vehicle operation manager is one of said plurality of drivers and said modification of each of said set of operational functions assigned to each of said plurality of drivers is one of the functions that said manager is enabled to perform.

10. The method for controlling vehicle operational functions of claim 7:
    wherein said step of enabling said manager enables said manager to modify remotely from said motor vehicle through wirelessly transmitting commands for modifying.

11. The method for controlling vehicle operational functions of claim 8 further including the steps of:
    sensing a set of motor vehicle operating conditions; and
    automatically modifying the functions said operators are enabled to perform in response to predetermined sensed operating conditions.

12. The method for controlling vehicle operational functions of claim 11 wherein:
    said sensed operating conditions indicate an emergency; and
    all limitations on operational functions are interrupted in response to said emergency.

13. A computer program having code recorded on a computer readable medium for controlling motor vehicle operational functions enabled for each of a plurality of vehicle drivers in a motor vehicle having an incorporated data processor for controlling vehicle operations comprising:
    means for assigning to each of said plurality of drivers a vehicle operation key with a unique identifier;
    means for storing said identifiers
    means for assigning to each of said plurality of drivers a set of operational functions that each driver is enabled to perform;
    means for designating a vehicle operation manager; and
    means enabling said operation manager to dynamically modify each of said set of operational functions assigned to each of said plurality o drivers during the operation of the vehicle by the driver.

14. The computer program or controlling vehicle operational functions of claim 13 further including:

means for receiving one of said vehicle operation keys; and means responsive to the receiving of said key for enabling all of the operational functions assigned to the driver identified by the key identifier.

15. The computer program for controlling vehicle operational functions of claim 14 wherein said vehicle operation manager is one of said plurality of drivers and said modification of each of said set of operational functions assigned to each of said plurality of drivers is one of the functions that said manager is enabled to perform.

16. The computer program for controlling vehicle operational functions of claim 13:

wherein said means enabling said manager to modify are remote from said motor vehicle; and further including means for wirelessly transmitting commands for modifying.

17. The computer program for controlling vehicle operational functions of claim 13 further including:

means for sensing a set of motor vehicle operating conditions; and means responsive to said means for sensing operating conditions for automatically modifying said functions said operators are enabled to perform in response to predetermined sensed operating conditions.

18. The computer program for controlling vehicle operational functions of claim 17 wherein:

said sensed operating conditions indicate an emergency; and all limitations on operational functions are interrupted in response to said emergency.

* * * * *